UNITED STATES PATENT OFFICE.

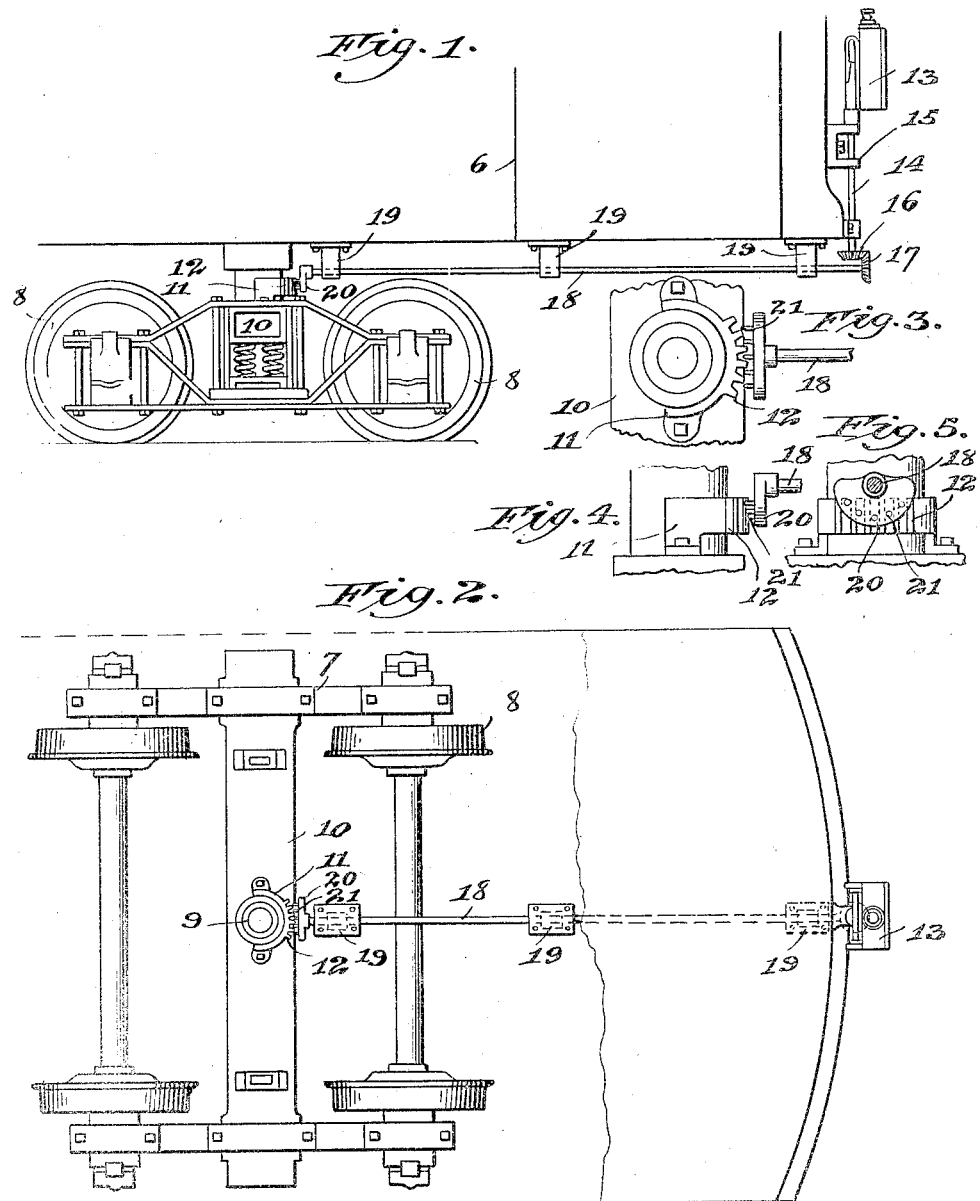

ALFRED S. CHURTON, OF CHICAGO, ILLINOIS

ADJUSTABLE HEADLIGHT.

959,920.   Specification of Letters Patent.   Patented May 31, 1910.

Application filed October 29, 1909. Serial No. 525,248.

*To all whom it may concern:*

Be it known that I, ALFRED S. CHURTON, a citizen of the United States, residing at Chicago, in the county of Cook and State of Illinois, have invented certain new and useful Improvements in Adjustable Headlights, of which the following is a specification.

The invention relates in general to headlights adapted for use upon locomotives and particularly upon street railway or electric cars having for its broad general object a headlight capable of automatic adjustment, whereby the lights will turn at an angle corresponding to the curvature of a track over which the car passes, and will not follow the longitudinal axial line of the car, as is the case where a headlight is rigidly attached to the car body.

Among the principal objects of my invention is to provide a device that is simple and economical in its construction and one in which the parts thereof will withstand the shocks which are imparted to a device of this character and will adapt itself to the various angular movements between the car body and trucks.

With the foregoing and other objects in view, the invention consists broadly of a headlight pivotally connected to the car body, capable of being turned upon its pivot by a suitable gear and shaft connection, transmitting the angular movement of the trucks of the car to the lamp or lamps.

The preferred embodiment of the invention is herein shown in the drawing, in which—

Figure 1 is a side elevational view of a portion of a car having my improved device attached thereto. Fig. 2 is a top plan view of Fig. 1, a portion of the car body being broken away. Fig. 3 is a top plan view of the gear and pinion connections shown in Fig. 1. Fig. 4 is a side elevational view of Fig. 3. Fig. 5 is a front elevational view of Fig. 3.

Referring now more specifically to the drawing, the car body 6 has the truck frame 7 and wheels 8 secured thereto in the usual manner, said truck frame being pivotally connected as a whole to the car body by means of the truck pivot pin 9. Secured to the bolster frame 10 of the truck frame 7 is a segmental gear 11, partially surrounding the truck pivot pin 9 and provided with relatively long teeth 12. The headlight 13 is mounted on a suitable standard 14, which has a pivotal connection with a bracket 15 that is secured to the car body in any well-known manner. The standard 14 carries a beveled gear 16 in mesh with a suitable beveled gear 17 at one end of the shaft 18. Said shaft 18 is secured to the under side of the car body by means of suitable bearings 19 and carries at its other end a suitable pinion gear 20, provided with the pinions 21, which pinions are adapted to be in mesh with the teeth on the segmental gear 11.

One of the principal features of the invention resides in the fact that the pinions on the gear 20 are so arranged as to come in contact with the teeth 12 on the gear 11 at a point substantially intermediate the length of the teeth, for the reason that the truck as a whole has a certain amount of play and if it were not for the relatively long teeth, the pinions would become disengaged, as by slipping out of mesh with the teeth, and thereby interfere with the operation of the device. To prevent, therefore, disengaging of the gear 11 from the pinion gear 20, the teeth on the former are constructed of considerable length so as to admit of considerable movement between the car body and the trucks of said car, without disengaging the gear and pinion connection.

It will be readily seen from the foregoing description that upon an angular movement of the truck frame, as a whole, the segmental gear 11 will have a corresponding angular movement, which in turn, through the pinion gear 20, will impart a rotating movement to the shaft 18 and thereby, through the gears 16 and 17 and standard 14, the angular movement of the car trucks will impart a corresponding angular movement to the headlight 13, thereby causing the same to always direct its rays upon the track.

I do not consider myself the inventor of the broad principle of constructing a device whereby the angular movement of the headlight corresponds with the angular movement of the trucks of a car, but do consider myself to be the first to construct a practical device whereby the play or varying movements in a car truck will not interfere with the successful operation of the headlight, and therefore without confining myself to the particular details of construction herein shown,—

I claim:

1. The combination of a car body and a truck, of a gear secured to the pivot pin of said truck and movable therewith, a lamp mounted upon a standard, said standard being rotatably mounted in bearings secured to said car body, and having a gear at its lower end, a shaft mounted on suitable bearings secured to said car body and having a gear at one end in mesh with the gear on said standard, and a pinion gear at its other end, the pinions of which are arranged in an arc, and in mesh with the teeth of the gear on said pivot pin.

2. The combination of a car body and a truck, of a gear having relatively long teeth secured to the pivot pin of said truck and movable therewith, a lamp mounted upon a standard, said standard rotatably mounted in bearings secured to said car body and having a gear at its lower end, a shaft mounted on suitable bearings and secured to said car body and having a gear at one end in mesh with the gear on said standard, and a pinion gear on the other end of said shaft in mesh with the teeth of the gear on said pivot pin, the pinions on said pinion gear being arranged in an arc.

As evidence that I claim the foregoing as my invention I have signed the same this 23rd day of October, 1909, in the presence of two witnesses.

ALFRED S. CHURTON.

Witnesses:
FRANK L. BELKNAP,
JAMES R. OFFIELD.